United States Patent [19]

Brouard et al.

[11] 4,123,429

[45] Oct. 31, 1978

[54] 1:1 CHROMIFEROUS COMPLEX AZO COMPOUNDS HAVING A BIDENTATE CHELATING GROUP AND A MONOFUNCTIONAL NEUTRAL LIGAND

[75] Inventors: Claude M. H. E. Brouard, Sotteville les Rouen; Paulette G. Ficht, Mont Saint Aignan, both of France

[73] Assignee: Produits Chimiques Ugine Kuhlmann, Paris, France

[21] Appl. No.: 736,027

[22] Filed: Oct. 27, 1976

Related U.S. Application Data

[63] Continuation of Ser. No. 609,638, Sep. 2, 1975, abandoned, which is a continuation of Ser. No. 426,379, Dec. 19, 1973, abandoned.

[30] Foreign Application Priority Data

Dec. 28, 1972 [FR] France .................................. 72.46599

[51] Int. Cl.² ............................................. C09B 45/16
[52] U.S. Cl. .............................. 260/147; 260/146 R; 260/149; 260/150; 260/151; 260/429 C; 260/438.5 R; 542/422
[58] Field of Search ........................ 260/147, 149, 151

[56] References Cited

U.S. PATENT DOCUMENTS

| | | | |
|---|---|---|---|
| 2,708,193 | 5/1955 | Pfitzner et al. ...................... 260/147 |
| 3,356,671 | 12/1967 | Johnson et al. ................... 260/145 R |
| 3,538,073 | 11/1970 | Mack et al. ........................ 260/146 D |
| 3,544,545 | 12/1970 | Idelson ................................ 260/147 |
| 3,551,406 | 12/1970 | Idelson ................................ 260/147 |
| 3,728,328 | 4/1973 | Lienhard et al. ..................... 260/147 |
| 3,878,158 | 4/1975 | Brouard et al. ................. 260/147 X |

OTHER PUBLICATIONS

Idelson et al., *J. Am. Chem. Soc.*, vol. 88, 1966, pp. 186–187.
Idelson et al., *Inorganic Chemistry*, vol. 6, 1967, pp. 450–458.

*Primary Examiner*—Charles F. Warren
*Attorney, Agent, or Firm*—Beveridge, DeGrandi, Kline & Lunsford

[57] ABSTRACT

Chromiferous complexes of the type:

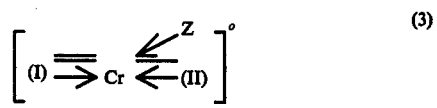

in which (I) represents the residue of a metallizable azo or azomethine compound, (II) represents the residue of a bidentate chelating agent and Z represents a monofunctional neutral ligand: process for the preparation of such complexes which comprises reacting a bidentate chelating agent with a 1:1 cationic chromium complex of an azo or azomethine compound in the presence of ammonia or an organic base and the use of such complexes for the coloration of synthetic materials.

6 Claims, No Drawings

1:1 CHROMIFEROUS COMPLEX AZO COMPOUNDS HAVING A BIDENTATE CHELATING GROUP AND A MONOFUNCTIONAL NEUTRAL LIGAND

This is a continuation of application Ser. No. 609,638 filed Sept. 2, 1975 now abandoned which, in turn is a continuation of application Ser. No. 426,379, filed Dec. 19, 1973 now abandoned.

The present invention relates to new chromiferous complex compounds, to their process of preparation and their application.

Numerous chromiferous complex dyestuffs free from acid groups, obtained by the action of salts or organic complexes of chromium with metallisable dyestuffs, are at present known.

These chromiferous complexes may be of the 1:2 type, in which a chromium atom is linked to two molecules of dyestuff, or of the 1:1 type, in which one chromium atom is linked to one molecule of dyestuff. The 1:1 complexes (H. Baumann and H. R. Hansel, Fortschritte der chemischen Forschung, 1967, 7,4 page 656) would be of a cationic nature, for example of the type:

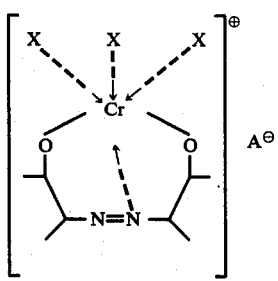

(1)

in which formula X represents a neutral monofunctional coordinate or ligand and $A^\ominus$ represents a monovalent anion.

The 1:2 complexes on the contrary would be of an anionic nature, for example of the type:

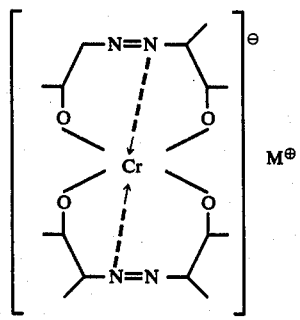

(2)

with $M^\oplus$ being the cation.

1:2 complexes are also known in which the two molecules linked to the chromium atom are different. These complexes, generally called "mixed complexes", are also of anionic nature.

According to the present invention, new mixed chromiferous complexes may be represented by the following scheme:

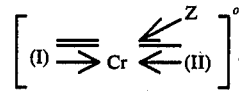

(3)

in which (I) represents the residue of a metallisable azo or azo-methinic compound, (II) represents the residue of a bidentate, coloured or colourless, chelating agent, and Z represents a monofunction neutral ligand.

These new chromiferous complexes may be prepared for example by the reaction of a bidentate chelating agent with a 1:1 cationic chromium complex of a metallisable azo or azomethinic compound in the presence of ammonia or an organic base. This reaction may be effected, for example, directly in the medium in which the 1:1 cationic chromium complex is formed by the addition of the theoretical amount of the bidentate coordinate. The reaction is preferably carried out at a temperature between 20° C. and 100° C. and in the presence of an excess of ammonia or of organic base, for example, pyridine, laurylamine, an ethylamine or an ethanolamine.

A large number of bidentate chelating agents are known ("Chelating agents and metal chelates", edited by F. P. Dwyer and D. P. Mellor, chapters 3 and 4). These are products capable of being linked to the chromium by a covalent linkage and a coordinating linkage forming with the chromium a five- or six- membered ring. Examples of chelating agents of residue (II) are β-diketones, o-hydroxyaldehydes, nitrogen heterocyclic compounds containing a hydroxy group in the peri position with respect to a nitrogen atom, o-nitrosophenols or -naphthols, and perihydroxyquinones.

Many metallisable azo or azomethinic compounds capable of providing the residue (I) are described in the literature. They are known chiefly as dyestuffs. Examples of such compounds are o,o'-dihydroxy, o-carboxy-o'-hydroxy, o-hydroxy-o'-aminoazo or azomethine compounds and they may be represented by the general formula:

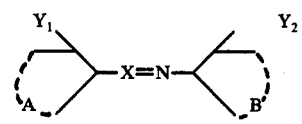

(4)

in which X represents a CH residue or a nitrogen atom, A represents the residue of a benzene, naphthalene or heterocyclic nucleus, B represents the residue of a benzene, naphthalene, benzoaliphatic or heterocyclic residue, A and B are unsubstituted or each may carry up to three non-ionic substituents, $Y_1$ represents a hydroxy, methoxy or carboxy group and $Y_2$ represents a hydroxy or amino group.

The compounds of formula (4) in which X represents a nitrogen atom result from the coupling of the diazo derivative of an amine of the formula:

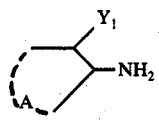

(5)

with a coupling compound of the formula:

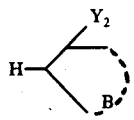

(6)

$Y_1$, $Y_2$, A and B being as defined above.

Suitable compounds of formula (5) are, for example, 2-aminophenol, 4-nitro- or 5-nitro-2-aminophenol, 4,6-dinitro-2-aminophenol, 4- or 5-chloro-2-aminophenol, 4,6-dichloro-2-aminophenol, 4-chloro-5-nitro- or 4-chloro-6-nitro-2-aminophenol,4-chloro-6-nitro-2-amino-phenol, 4- or 5-sulphonamido-2-aminophenol, 4-nitro-6-chloro-2-aminophenol, 4-methyl-2-aminophenol, the 4- or 5-(N-alkyl- or N,N-dialkyl-sulphonamido)-2-aminophenols, anthranilic acid, 3-, or 4-, or 5-, or 6-chloroanthranilic acids, 3,5-dichloroanthranilic acid, 5-nitro-anthranilic acid, o-anisidine, 4- or 5-nitro-o-anisidines, 4-chloro- or 4-methyl- or 4-methoxy-o-anisidines, 2-amino-1-naphthol, 2-amino-4-methyl-1-naphthol or 1-amino-2-naphthol.

Suitable coupling compounds of formula (6) are, for example, acetoacetanilide and its derivatives, mono-, di- or tri- substituted on the nucleus by halogen atoms or alkyl, alkoxy or nitro groups, 3-methyl-5-pyrazolone, 1-phenyl-3-methyl-5-pyrazolone and its derivatives, mono-, di-, or tri-substituted on the phenyl group by chlorine atoms or methyl or nitro groups, 1-phenyl-3-carbonamido- or 3-ethoxycarbonyl-5-pyrazolone, paracresol, the monoalkyl ethers of hydroquinone, 2-acetamido-paracresol, resorcinol, alpha-naphthol or beta-naphthol, 1,5-or 2-6-dihydroxy-naphthalenes, 4-alkyl or 4-alkoxy-1-naphthols, alpha- and beta-naphthylamines, 1-amino-7-naphthol and its N-acetyl or carboxymethyl derivatives, 2,4-dihydroxy-quinoline, 6-methyl-8-hydroxy-quinoline, 6-hydroxy- or 6-amino-benzimidazoles.

The compounds of formula (4) in which X represents a CH group may be obtained by known processes, for example by condensation of a compound of the formula:

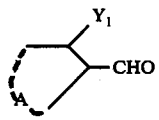

(7)

with an amine of the formula:

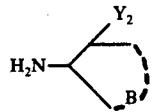

(8)

Examples of compounds of formula (7) are salicylaldehyde, 5- chloro-2-hydroxy-benzaldehyde, 3,5-dichloro-2-hydroxy-benzaldehyde, 3-chloro-5-methyl-2-hydroxy-benzaldehyde, 3,5-dimethyl-2-hydroxy-benzaldehyde, 4,5-dimethyl-2-hydroxy-benzaldehyde, 5-methoxy-2-hydroxy-benzaldehyde, and 2-hydroxy-1-naphthaldehyde.

Suitable amines of formula (8) are those previously mentioned to illustrate the formula (5).

The 1:1 cationic chromium complexes of metallisable azo or azomethine compounds of formula (4) may be prepared by known methods. These generally provide for the use of a polar solvent (for example an alcohol, polyol, or cellosolve) or an aprotic solvent (for example dimethyl formamide, or hexaphosphotriamide). and a salt of trivalent chromium (for example chromium fluoride or chloride). Preferably a solvent of boiling point above 110° C. is used, which in the temperature interval 110° C. to 130° C. allows the metallisable dyestuffs to be converted into 1:1 cationic chromium complexes in a relatively short time and completely, with a chromium concentration slightly greater than the theoretical.

The new mixed chromiferous complexes obtained are distinguished from the known 1:1 and 1:2 complexes by their practically zero displacement on electrophoresis and their solubility in the hydrocarbon solvents. Analyses enable the following structure to be attributed to them:

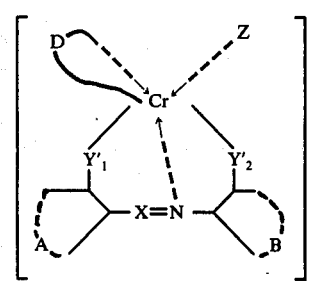

(9)

in which A, B, X and Z have the same significance as above, D represents the residue of the bidentate chelating agent, $Y'_1$ represents an oxygen atom or a COO group and $Y'_2$ represents an oxygen atom or an —NH— group.

The mixed chromiferous complexes according to the invention are particularly suitable for the colouration of synthetic materials, especialy polyamides, polyesters and cellulose triacetate. They may be used to dye or print fibres based on polyamides, polyesters or cellulose triacetate by the usual techniques of dyeing and printing. They may be used in a dispersed state. The dispersing agents which can be used are, for example, the products of condensation of cresols with formaldehyde and naphtholsulphonic acids, the condensation products of naphthalenesulphonic acids with formaldehyde, especially the dinaphthylmethane-disulphonates, sulphuric esters of fatty alcohols, for example, sodium laurylsulphate, lignosulphonates, soaps, the alkali metal salts of the sulphuric acid esters of monoglycerides of fatty acids, the condensation products of 4,4'-dihydroxydiphenylsulphone with formaldehyde and the alkali metal bisulphites.

These mixed chromiferous complexes according to the invention which have a very good thermal stability can also be used for the colouration of bulk macromolecular synthetic materials such as the polyesters and polyamides, for example by introduction into the material to be spun.

The chromiferous complexes according to the invention enable shades ranging from yellow to black to be obtained. They are particularly valuable for the production of homogeneous deep violet, blue, green or black shades. Their fastness to sublimation is excellent.

The invention is illustrated by but not limited to the following Examples in which the parts are parts by weight unless the contrary is indicated.

EXAMPLE 1

30.9 parts of the monoazo dyestuff [4-nitro-2-hydroxybenzene]-<1 azo 1>-[2-hydroxy-naphthalene] are heated at 120° C–125° C. in 300 parts of diethyleneglycol with 21.5 parts of chromic chloride hexahydrate ($CrCl_3.6H_2O$) until the 1:1 chromium complex has been completely obtained. The mixture is then cooled to 60° C., 12 parts of acetylacetone are added and immediately 18 parts of 25% ammonia. The mixture is then run into 2000 parts of cold water and the crystallised dyestuff is filtered off, washed and dried. Its analysis corresponds to the formula:

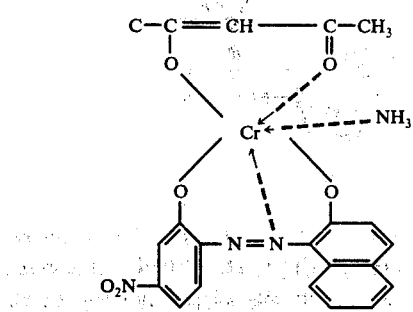

The same dyestuff is obtained if the diethyleneglycol is replaced by ethylene glycol or any other solvent having a boiling point greater than 110° C.

If the ammonia is replaced by 10 parts of pyridine, a dyestuff of the above formula in which the ammonia is replaced by pyridine is obtained.

In both cases, the dyestuffs obtained have solubilities in hydrocarbon solvents such as benzene, chlorobenzene, methylene chloride, chloroform, perchlorethylene which are not negligible, although the 1:1 or 1:2 chromium complexes of the same monoazo compound are insoluble in these solvents.

EXAMPLE 2

The dyestuff of Example 1 in the form of a pressed paste is kneaded and ground with 10 parts of a cresol-formaldehyde-naphtholsulphonic acid condensation product, then dried.

0.15 parts of the dyestuff thus obtained in a finely divided state is suspended in 100 parts of water containing 0.5 parts of an emulsion of ortho-dichlorobenzene. 5 parts of polyester yarn are added, and the medium is heated up to 140° C. in a period of an hour and maintained at this temperature for an hour. After rinsing and then stripping at 90° C. for 15 minutes in a bath containing 1 ml/liter of 30% sodium hydroxide and a quantity of sodium hydrosulphite sufficient to remove the dyestuff not fixed, a blue-grey shade is obtained with good fastness to light and to sublimation.

EXAMPLE 3

0.15 parts of the dyestuff of Example 1 in a dispersed state is suspended in 100 parts of water containing 0.5 parts of 10% acetic acid. 5 parts of polyamide yarn are added at 50° C. and the medium is heated to 100° C in a period of half an hour and maintained for an hour at the boil. A blue-grey shade of good general fastness is obtained.

On operating in an analogous manner to that described in Example 1, the shades indicated in the following Table are obtained with different metallisable dyestuffs.

| Example | Metallisable dyestuff of formula (4) | Shade on Polyester fibres |
|---|---|---|
| 4 | [4-nitro-2-methoxy-benzene]-<1 azo 2>-[1-hydroxy-4-methoxy-benzene] | blue-grey |
| 5 | [4-nitro-2-hydroxy-benzene]-<1 azo 2>-[1-hydroxy-5-diethylamino-benzene] | violet |
| 6 | [4-nitro-2-hydroxy-benzene]-<1 azo 4>-[1-phenyl-3-methyl-5-pyrazolone] | red |
| 7 | [4-nitro-2-hydroxy-benzene]-<1 azo 1>-[2-hydroxy-4-amino-benzene] | violet |
| 8 | [5-nitro-2-hydroxy-benzene]<1 azo 2>-[1-hydroxy-4-methyl-naphthalene] | black |
| 9 | [5-nitro-2-hydroxy-benzene]-<1 azo 2>-[1-hydroxy-4-methoxy-benzene] | black |
| 10 | [5-nitro-2-hydroxy-benzene]-<1 azo 1> [2-hydroxy-naphthalene] | violet |
| 11 | [3,5-dinitro-2-hydroxy-benzene]-<1 azo 2>-[1-hydroxy-4-methoxy-benzene] | green |
| 12 | [3,5-dinitro-2-hydroxy-benzene]-<1 azo 2>-[1-hydroxy-5-diethylamino-benzene] | violet |
| 13 | [3,5-dinitro-2-hydroxy-benzene]-21 1 azo 2>-[1-hydroxy-4-methyl-naphthalene] | green |
| 14 | [3,5-dinitro-2-hydroxy-benzene]-<1 azo 1>-[2-amino-naphthalene] | green |
| 15 | [5-chloro-2-hydroxy-benzene]-<1 azo 2>-[1-hydroxy-4-methyl-naphthalene] | blue |
| 16 | [3,5-dichloro-2-hydroxy-benzene]-<1 azo 4>-[1-phenyl-3-methyl-5-pyrazolone] | orange |
| 17 | [3,5-dichloro-2-hydroxy-benzene]-<1 azo 2>-[1-hydroxy-4-methyl-naphthalene] | blue |
| 18 | [3,5-dichloro-2-hydroxy-benzene]-<1 azo 1>-[2-hydroxy-naphthalene] | violet |
| 19 | [4-nitro-5-chloro-2-hydroxy-benzene-<1 azo 1>- [2-hydroxy-naphthalene] | blue |
| 20 | [4-nitro-5-chloro-2-hydroxy-benzene] <1 azo 2>-[1-hydroxy-4-methyl-naphthalene] | blue |
| 21 | [5-nitro-3-chloro-2-hydroxy-benzene-]-<1 azo 1>-[2-hydroxy-naphthalene] | brown-violet |
| 22 | [2-carboxy-benzene]-<1 azo 3>-[aceto-acetanilide] | yellow |
| 23 | [2-carboxy-benzene]-<1 azo 4 >-[1-phenyl-3-methyl-5-pyrazolone] | yellow |
| 24 | [3,5-dinitro-2-hydroxy-benzene]-<1 azo 1 >-[2-hydroxy-naphthalene] | green-black |
| 25 | [3-chloro-5-nitro-2-hydroxy-benzene]-<1 azo 2>-[1-hydroxy-4-methyl-naphthalene] | green-black |
| 26 | [4-sulphamido-2-hydroxy-benzene]<1 azo 1>[2-hydroxy-6-bromo-naphthalene] | violet |
| 27 | [5-sulphamido-2-hydroxy-benzene]-<1 azo 1>[2-hydroxy-8-acetylamino-naphthalene] | grey |
| 28 | [4-sulphamido-2-hydroxy-benzene]-<1 azo 1>-[2-hydroxy-6-bromo-naphthalene] | violet |
| 29 | [3,5-dichloro-2-hydroxy-benzene]-<1 azo 1>-[2-hydroxy-6-bromo-naphthalene] | violet |
| 30 | [3,5-dichloro-2-hydroxy-benzene]-<1 azo 1>-[2,6-dihydroxy-naphthalene] | grey |
| 31 | [3,5-dinitro-2-hydroxy-benzene]-<1 azo 1>[2-hydroxy-6-bromo-naphthalene] | grey |
| 32 | [4-nitro-2-hydroxy-benzene]-<1 azo 2>[1-hydroxy-4-methyl-naphthalene] | green-blue |
| 33 | [5-N-methylsulphamido-2-hydroxy-benzene]-<1 azo 1>-[2-hydroxy-8-acetylamino-naphthalene] | grey |
| 34 | [3,5-dinitro-2-hydroxy-benzene]-<1 azo 1>-[2-hydroxy-8-acetylamino-napthalene] | green-grey |
| 35 | [3,5-dichloro-2-hydroxy-benzene]-<1 azo 1>-[2-hydroxy-8-acetylamino-naphthalene] | grey |
| 36 | [4,6-dichloro-2-carboxy-benzene]-<1 azo 4>-[1-phenyl-3-methyl-5-pyrazolone] | yellow |

EXAMPLE 37

32.3 parts of the dyestuff [5-nitro-2-hydroxy-benzene]-<1 azo 2>-[1-hydroxy-4-methyl-naphthalene] are heated at 120° C.–1250° C. in 300 parts of diethyleneglycol with 21.5 parts of chromic chloride hexahydrate until it has been completely converted into the 1:1 chromium complex. The mixture is cooled to 60°|70° C., 19.4 parts of benzoylacetone are added and then 10 parts of pyridine. The mixture is then run into 2000 parts of cold water and the crystalline dyestuff is filtered off, washed, dispersed and dried. It corresponds to the formula:

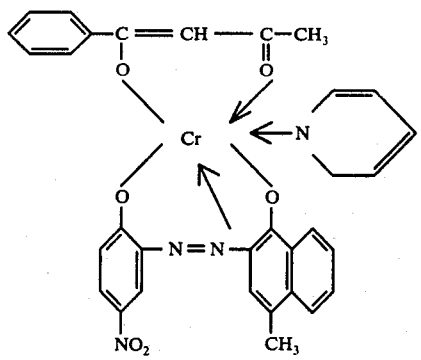

When applied as indicated in Example 2, it colours polyester fibres black.

On replacing the benzoylacetone in this Example by another chelating agent, the shades indicated in the following Table are obtained on polyester fibres.

| Example | Bidentate chelating agent | Shade |
|---|---|---|
| 38 | 1,3-diphenyl-1,3-propanedione | black |
| 39 | salicylaldehyde | black |
| 40 | 2-hydroxy-1-naphthaldehyde | black |
| 41 | 4,6-dichloro-salicylaldehyde | black |
| 42 | 2,6-dihydroxy-1,5-napthalene-dicarbaldehyde | |
| 43 | 8-quinolinol | green |
| 44 | 1-nitroso-2-naphthol | black |
| 45 | 1,2-dihydroxy-anthraquinone | brown |

EXAMPLE 46

12.2 parts of salicylaldehyde are reacted with 18.85 parts of 6-chloro-4-nitro-2-amino-phenol in 150 parts of diethyleneglycol. Then 27 parts of chromic chloride hexahydrate are added and the mixture is heated at 115° C for 5 hours. The solution is allowed to cool to 65° C. and 10 parts of acetylacetone and 31.6 parts of pyridine are added. It is maintained for 3 hours at 70° C. and then the solution is run into 500 parts of cold water. The crystalline dyestuff is filtered off and dried, and it colours polyester fibres yellow.

EXAMPLE 47

1 part of the dyestuff of Example 1 is mixed with 50 parts of polyester in granules or in powder, then the mixture is heated to 280°–300° C and spun. The threads are suddenly cooled by immersion, then drawn out. They are coloured a neutral black shade.

When only 0.25 parts of the dyestuff of Example 1 is used, a grey shade is obtained.

In both cases, the colouration are marked by excellent fastness to light.

EXAMPLE 48

Polyamide granules are dyed as indicated in Example 3 with the dyestuff of Example 16. These dyed granules are melted at 250°|280° C. and converted into threads or into articles of an orange shade of excellent fastness to light.

The mixture of granules of polyamide and of the dyestuff of Example 16 can also be melted and converted into threads or articles of which the orange shade is also very fast.

We claim:

1. A chromiferous complex of formula:

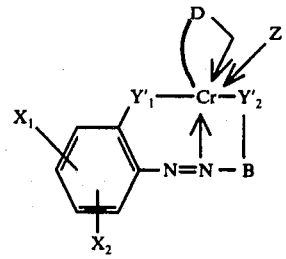

in which

D is the residue of a bidentate chelating agent selected from the group consisting of acetylacetone, benzoylacetone, 1,3-diphenyl-1,3-propanedione and salicylaldehyde:

Y'₁ is oxygen or

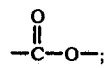

Y'₂ is oxygen or

Z is a monofunctional neutral ligand selected from the group consisting of ammonia, pyridine, ethylamine, ethanolamine and laurylamine;

X₁ is hydrogen, chlorine or nitro;

X₂ is hydrogen, chloro, nitro, sulfonamido or methylsulfonamido, with the proviso that X₁ is always hydrogen when X₂ is sulfonamido or methylsulfonamido and that Y'₁ is

when both X₁ and X₂ are hydrogen; and —B—Y'₂— is one of the following radicals:

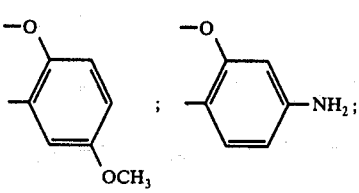

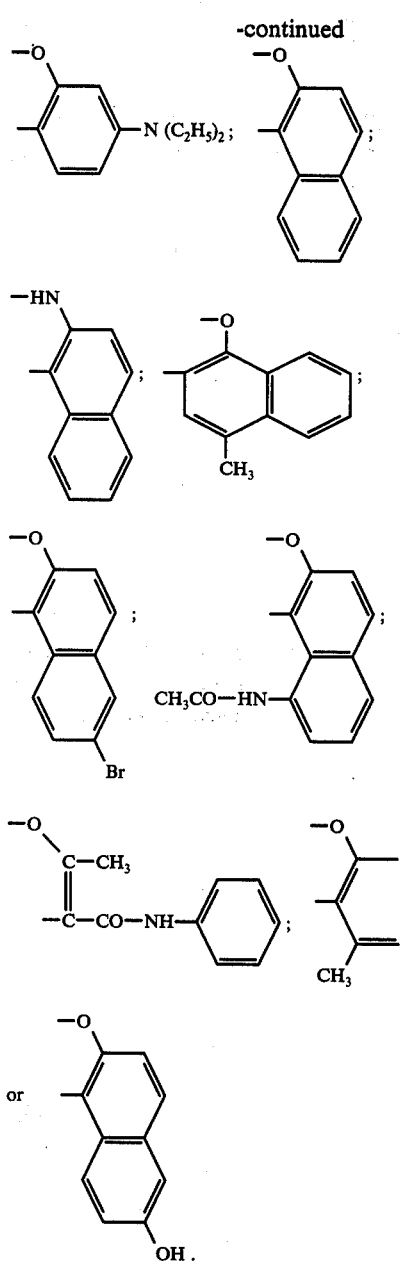
2. The chromiferous complex of formula:
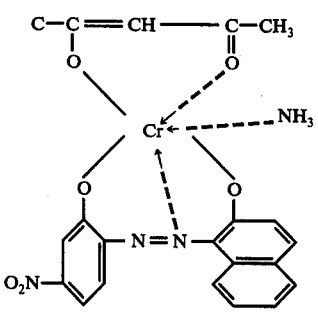
3. The chromiferous complex of the formula:
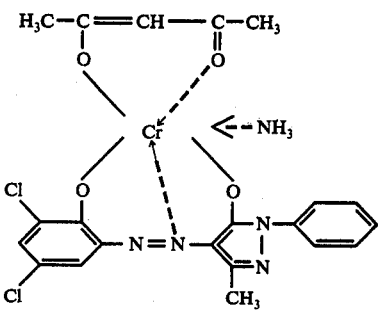
4. The chromiferous complex of the formula:
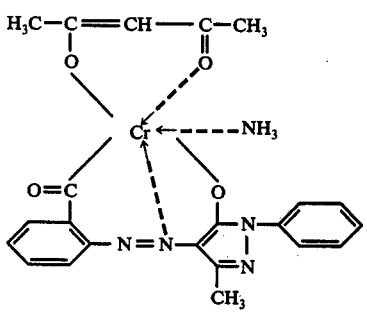
5. The chromiferous complex of the formula:
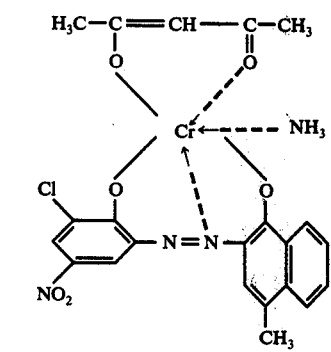
6. The chromiferous complex of the formula:
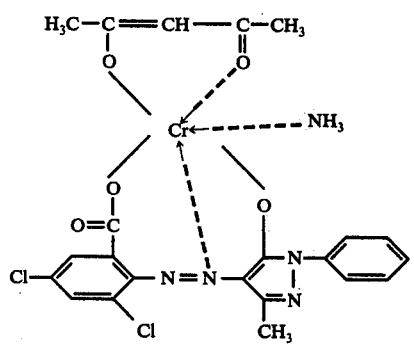
* * * * *